United States Patent
Fukuda et al.

(10) Patent No.: US 9,262,122 B2
(45) Date of Patent: Feb. 16, 2016

(54) ARITHMETIC PROCESSING APPARATUS AND CONTROL METHOD OF ARITHMETIC PROCESSING APPARATUS

(71) Applicant: FUJITSU LIMITED, Kawasaki-shi, Kanagawa (JP)

(72) Inventors: Takatoshi Fukuda, Sagamihara (JP); Shuji Takada, Kawasaki (JP); Kenjiro Mori, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/150,819

(22) Filed: Jan. 9, 2014

(65) Prior Publication Data
US 2014/0281059 A1   Sep. 18, 2014

(30) Foreign Application Priority Data
Mar. 18, 2013   (JP) .................................. 2013-055470

(51) Int. Cl.
| | | |
|---|---|---|
| G06F 3/00 | (2006.01) | |
| G06F 5/14 | (2006.01) | |
| G06F 12/08 | (2006.01) | |
| G06F 12/12 | (2006.01) | |

(52) U.S. Cl.
CPC .............. *G06F 5/14* (2013.01); *G06F 12/0804* (2013.01); *G06F 12/0831* (2013.01); *G06F 12/123* (2013.01)

(58) Field of Classification Search
CPC ....................................................... G06F 5/14
See application file for complete search history.

(56) References Cited

U.S. PATENT DOCUMENTS

| | | | |
|---|---|---|---|
| 5,745,732 A | | 4/1998 | Cherukuri et al. |
| 5,765,196 A | * | 6/1998 | Liencres et al. ............... 711/143 |
| 5,987,571 A | * | 11/1999 | Shibata et al. ................ 711/141 |
| 6,038,644 A | | 3/2000 | Irie et al. |
| 6,067,608 A | * | 5/2000 | Perry ............................ 711/203 |
| 6,321,300 B1 | * | 11/2001 | Ornes et al. ................... 711/135 |
| 6,622,219 B2 | * | 9/2003 | Tremblay et al. ............. 711/147 |
| 2004/0078532 A1 | * | 4/2004 | Tremaine ...................... 711/160 |

FOREIGN PATENT DOCUMENTS

| | | |
|---|---|---|
| EP | 0793178 A2 | 9/1997 |
| JP | 61-237145 | 10/1986 |

(Continued)

OTHER PUBLICATIONS

"Write Buffer Design for Cache-Coherent Shared-Memory Multi-processors" by Farnaz Moulles-Toussi and David J. Lilja, 1995 IEEE.*
Extended European Search Report dated Jun. 25, 2014 for corresponding European Patent Application No. 13198269.6, 7 pages.

*Primary Examiner* — Henry Tsai
*Assistant Examiner* — Jing-Yih Shyu
(74) *Attorney, Agent, or Firm* — Fujitsu Patent Center (57) ABSTRACT

In a multicore system in which a plurality of CPUs each including a cache memory share one main memory, a write buffer having a plurality of stages of buffers each holding data to be written to the main memory and an address of a write destination is provided between the cache memory and the main memory, and at the time of a write to the write buffer from the cache memory, an address of a write destination and the addresses stored in the buffers are compared, and when any of the buffers has an agreeing address, data is overwritten to this buffer, and the buffer is logically moved to a last stage.

3 Claims, 5 Drawing Sheets

(56) References Cited

FOREIGN PATENT DOCUMENTS

| JP | 07-044459 | 2/1995 |
| JP | 09-293060 | 11/1997 |
| JP | 09-311820 | 12/1997 |
| JP | 10-254774 | 9/1998 |

* cited by examiner

| LRU STATUS | 3rd Buffer | 2nd Buffer | 1st Buffer |
|---|---|---|---|
| 000 | A | B | C |
| 001 | A | C | B |
| 010 | B | A | C |
| 011 | B | C | A |
| 100 | C | A | B |
| 101 | C | B | A |

ARITHMETIC PROCESSING APPARATUS AND CONTROL METHOD OF ARITHMETIC PROCESSING APPARATUS

CROSS-REFERENCE TO RELATED APPLICATION

This application is based upon and claims the benefit of priority of the prior Japanese Patent Application No. 2013-055470, filed on Mar. 18, 2013, the entire contents of which are incorporated herein by reference.

FIELD

The embodiments discussed herein are directed to an arithmetic processing apparatus and a control method of an arithmetic processing apparatus.

BACKGROUND

A multicore system which executes processing by using a plurality of CPUs (Central Processing Units) adopts a structure in which the CPUs each have a cache memory and all the CPUs share a large-capacity, low-speed external memory (main memory or the like). It is also known that, in each of the CPUs, a write buffer is provided between the cache memory and the external memory in order to absorb the time for writing data from the cache memory to the external memory.

In the multicore system, data sharing among the CPUs is indispensable. Therefore, the cache memories each have a function called a snoop to keep coherency of cache data (cache coherency) among the CPUs. When the snoop is generated, the CPU receiving the snoop waits an access request from a CPU core to the cache memory, which leads to performance deterioration.

There has been proposed an art to store addresses included in access requests passing through a common bus, in a table of a cache system of each of CPUs, and when an address of a received access request is stored in the table, inhibit an access to the cache memory in response to this access request (for example, refer to Patent Document 1). There has also been proposed an art in which, regarding each area in an external memory, information indicating whether or not data is cached in each of the CPUs is stored in a table included in each of the CPUs, and a destination of a snoop request is limited based on the information stored in the tables to reduce a traffic (for example, refer to Patent Document 2).

[Patent Document 1] Japanese Laid-open Patent Publication No. 09-293060

[Patent Document 2] Japanese Laid-open Patent Publication No. 09-311820

In a cache memory having a snoop function, an access from a CPU core to the cache memory and an access to the cache memory by the snoop are performed exclusively. Therefore, when many snoops are generated, the access from the CPU core to the cache memory is often kept waited, which leads to performance deterioration.

SUMMARY

According to an aspect of the embodiments, an arithmetic processing apparatus includes a plurality of arithmetic processing parts which access one external memory via a bus, the arithmetic processing parts each including a cache memory, a processing part, a write buffer, and a control part. The write buffer is provided between the cache memory and the external memory and has a plurality of stages of buffers each holding a set of data to be written to the external memory and an address of a write destination. At the time of a write from the cache memory to the write buffer, the control part compares an address of a write destination and the addresses stored in the buffers, and when any of the buffers has an address agreeing with the address of the write destination, overwrites data to the buffer and logically moves the buffer to a last stage.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described with reference to the drawings.

Figure 1:
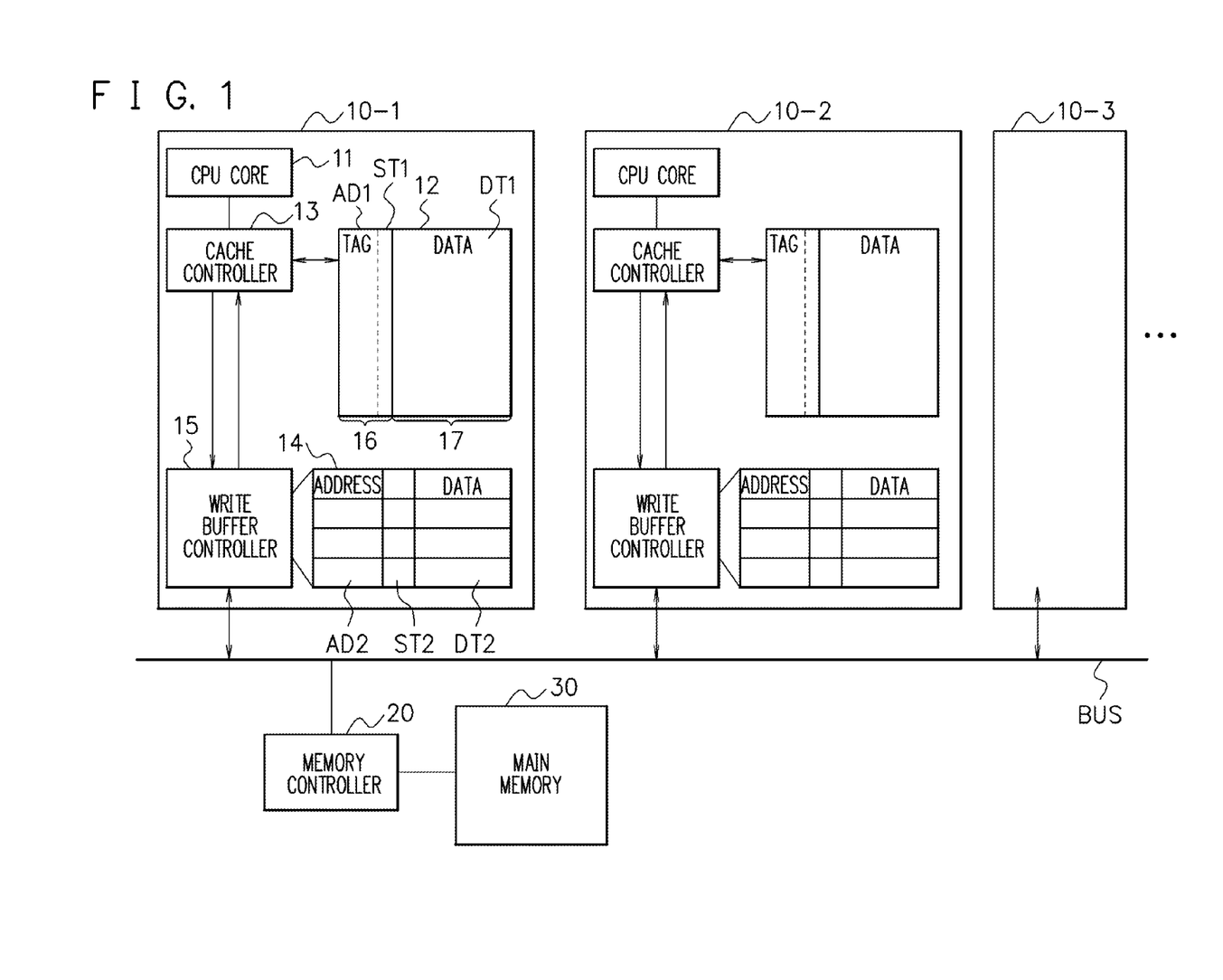
FIG. 1 is a diagram illustrating a configuration example of a multicore system in an embodiment.

FIG. 1 is a diagram illustrating a configuration example of a multicore system as an arithmetic processing apparatus in a present embodiment. The multicore system in this embodiment includes a plurality of CPUs 10-1, 10-2, 10-3, ... and a memory controller 20. The CPUs 10-1, 10-2, 10-3, ... and the memory controller 20 are connected to a bus BUS. The memory controller 20 is connected to a main memory 30 being an external memory. The main memory 30 is shared by all the CPUs 10-1, 10-2, 10-3, .... The CPUs 10-1, 10-2, 10-3 access the main memory 30 via the bus BUS and the memory controller 20.

The CPUs 10-1, 10-2, 10-3, ... each include a CPU core 11, a cache memory 12, a cache controller 13, a write buffer 14, and a write buffer controller 15. As an internal configuration of the CPUs 10-1, 10-2, 10-3, ..., FIG. 1 mainly illustrates the configuration involved in write of data. The CPU core 11 sequentially reads commands from the main memory 30 and so on and executes arithmetic processing according to the read commands.

The cache memory 12 holds data used for the arithmetic processing in the CPU core 11. The cache memory 12 includes a cache tag memory 16 in which address information of cache data and status information indicating a status and so on of the cache data are stored, and a cache data memory 17 in which the cache data are stored. The cache tag memory 16 has an area AD1 where to store the address information of the cache data and an area ST1 where to store the status information of the cache data. The cache data memory 17 has an area DT1 where to store the cache data. The cache controller 13 executes control regarding the cache memory 12. For example, the cache controller 13 writes and reads information and data to/from the cache memory 12, and determines whether or not requested data is stored in the cache memory 12.

The write buffer 14 is a buffer which holds data to be written to the main memory 30 from each of the CPUs 10-1, 10-2, 10-3, ... and addresses of write destinations. The write buffer 14 has a plurality of stages of buffers, each stage corresponding to one entry. The buffers on the respective stages in the write buffer 14 each have an area AD2 where to store the address of the write destination, an area ST2 where to store status information regarding the held data, and an area DT2 where to store the write data. The write buffer controller 15 executes control regarding the write buffer 14.

Figure 2:
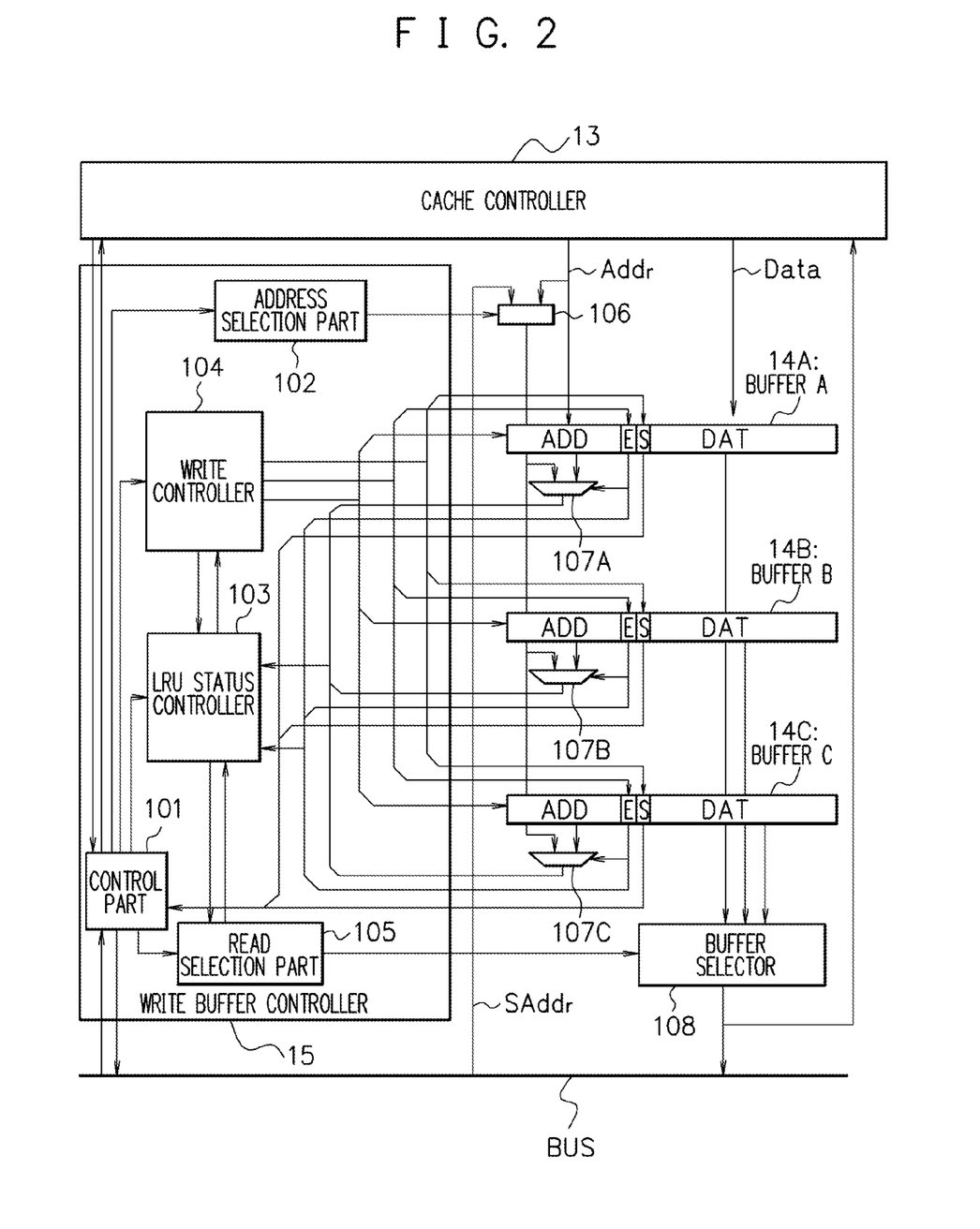
FIG. 2 is a diagram illustrating a configuration example of a write buffer and a write buffer controller in this embodiment.

FIG. 2 is a diagram illustrating a configuration example of the write buffer 14 and the write buffer controller 15 illustrated in FIG. 1. FIG. 2 illustrates an example where the write buffer 14 is a three-stage buffer of a buffer A 14A, a buffer B 14B, and a buffer C 14C, but it is noted that the embodiment is not limited to this, and the number of the buffer stages in the write buffer 14 is an arbitrary plural number.

The buffers 14A, 14B, 14C each have an area ADD, an empty bit E, a snoop bit S, and an area DAT. The area ADD is an area where to store the address of the write destination regarding the data to be written to the main memory 30, and the area DAT is an area where to store the data to be written to the main memory 30.

The empty bit E is a bit indicating whether or not the corresponding buffer is in an empty state where no write data is stored, in other words, indicating whether or not data is writable to the buffer. In this embodiment, a value of the empty bit E is "1" when the buffer is in the empty state (writable), and is "0" when the buffer is not in the empty state (not writable).

The snoop bit S is a bit indicating whether or not the data written in the buffer is data coherently read from another CPU. In this embodiment, a value of the snoop bit S is set to "0" at the time when data is written to the corresponding buffer, and is set to "1" when an address of a coherent read request being a snoop request, which is received from the other CPU, agrees with the address stored in the area ADD.

The write buffer controller 15 includes a buffer control part 101, an address selection part 102, a LRU (Least Recently Used) status controller 103, a write controller 104, and a read selection part 105. The buffer control part 101 controls the address selection part 102, the LRU status controller 103, the write controller 104, and the read selection part 105 that the write buffer controller 15 includes.

The address selection part 102 controls a selector 106 according to an output of the buffer control part 101. The address selection part 102 controls the selector 106 so that the selector 106 selects an address Addr in response to a write request from the own CPU to the main memory 30 while selects an address (snoop address) SAddr in response to a snoop request from another CPU, and outputs the selected address. The address Addr is an address that is input via the cache controller 13, at the time of the write request from the own CPU to the main memory 30. The address (snoop address) SAddr is an address that is input via the bus BUS, at the time of the snoop request from the other CPU.

Figure 3:
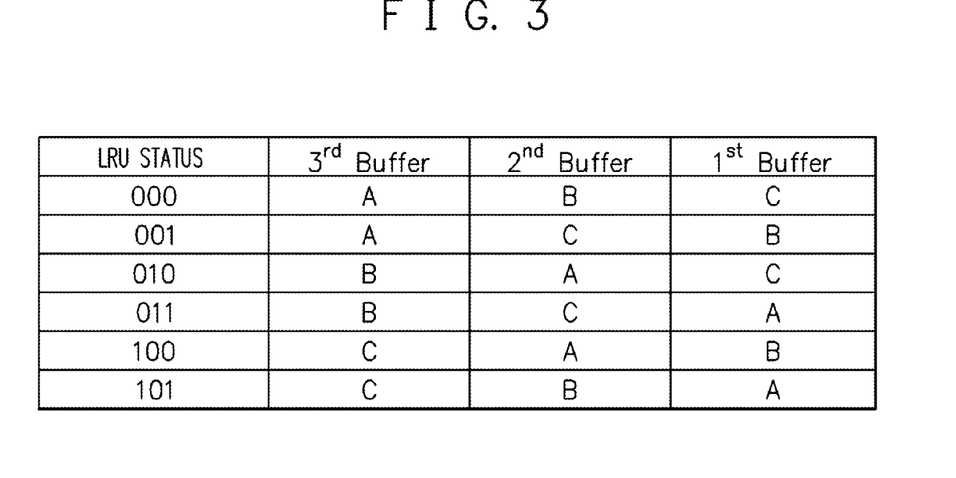
FIG. 3 is a chart representing an example of a LRU status in this embodiment.

The LRU status controller 103 controls a LRU status regarding the buffer A 14A, the buffer B 14B, and the buffer C 14C. The LRU status controller 103 manages and controls the LRU status (update status) regarding the buffer A 14A, the buffer B 14B, and the buffer C 14C, by using 3-bit information as illustrated in FIG. 3, for instance. In FIG. 3, a 3rd buffer represents a buffer updated last (newest buffer), a 2nd buffer represents a buffer updated second, and a 1st buffer represents a buffer updated first. In the description below as well, the 3rd buffer, the 2nd buffer, and the 1st buffer mean the same as above.

For example, when the LRU status is "000", the buffer C 14C is a buffer updated first, the buffer B 14B is a buffer updated second, and the buffer A 14A is a buffer updated last (newest buffer). For example, when the LRU status is "101", the buffer A 14A is a buffer updated first, the buffer B 14B is a buffer updated second, and the buffer C 14C is a buffer updated last (newest buffer).

The write controller 104 controls the write to the buffer A 14A, the buffer B 14B, and the buffer C 14C according to an output of the buffer control part 101 and an output of the LRU status controller 103. The read selection part 105 controls a buffer selector 108 according to an output of the buffer control part 101 and an output of the LRU status controller 103, and outputs, to the bus BUS, the addresses and the data written in the buffer A 14A, the buffer B 14B, and the buffer C 14C. Comparators 107A, 107B, 107C each determine whether or not the address stored in the area ADD agrees with the address output from the selector 106 when the value of the empty bit E of the corresponding buffer is "0", and output the determination result to the LRU status controller 103.

Next, the operation will be described.

Figure 4:
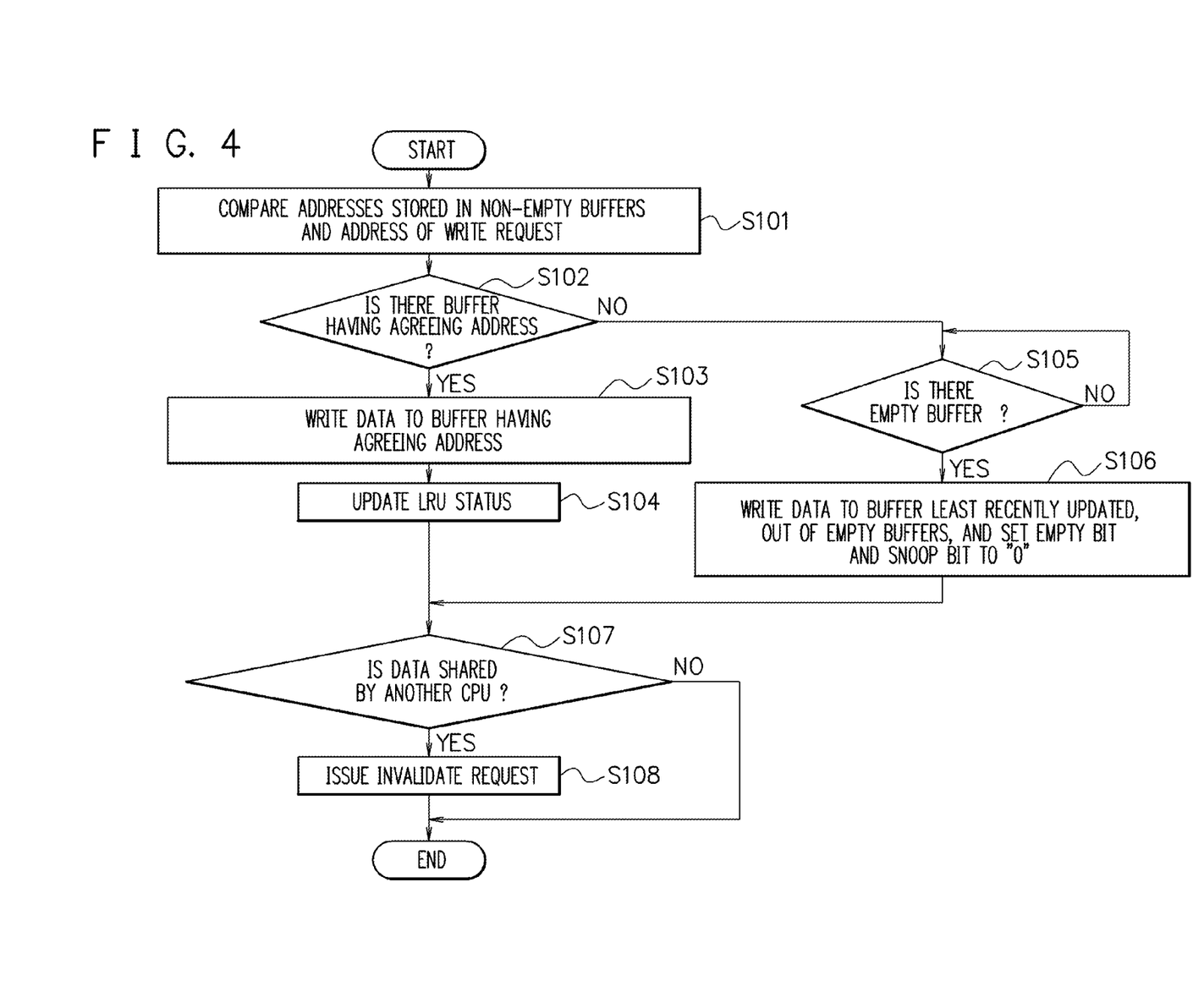
FIG. 4 is a flowchart representing an example of write processing to the write buffer in this embodiment.

First, write processing to the write buffer 14 in this embodiment will be described. FIG. 4 is a flowchart representing an example of the write processing to the write buffer 14 in this embodiment. At the time of the write of data from the cache memory 12 to the write buffer 14, a write request control signal, the address Addr, and data Data are input via the cache controller 13. Upon receiving the write request control signal, the buffer control part 101 of the write buffer controller 15 notifies to the functional parts 102, 103, 104 that this request is a write request to the write buffer 14 from the cache memory 12.

Consequently, the address selection part 102 controls the selector 106 so that the selector 106 selects and outputs the address Addr input via the cache controller 13. Then, the comparators 107A, 107B, 107C each compare the address stored in the buffer whose empty bit E does not have a value "1" (which is not in the empty state) and the address Addr of the write request, and output the result to the LRU status controller 103 (S101).

Next, based on the outputs of the comparators 107A, 107B, 107C, the LRU status controller 103 determines whether or not any of the buffer A 14A, the buffer B 14B, and the buffer C 14C has an agreeing address (S102). When the determination results in that there is a buffer having the agreeing address (YES at S102), the LRU status controller 103 instructs the write controller 104 to write the data to this buffer. The write controller 104 writes (overwrites) the data Data to the buffer having the agreeing address (S103).

Further, the LRU status controller 103 updates the LRU status so that the buffer which has the agreeing address and to which the data Data is written becomes the buffer on the last stage (newest buffer) (S104). That is, the LRU status controller 103 changes information of the LRU status in the following ways <a1> to <a6> so that the buffer which has the agreeing address and to which the data Data is written is logically moved to the last stage.

<a1> When the buffer having the agreeing address is the 3rd buffer, the LRU status controller 103 does not change the information of the LRU status.

<a2> When the buffer having the agreeing address is the 2nd buffer and the value of the empty bit E of the 3rd buffer is "1", the LRU status controller 103 does not change the information of the LRU status.

<a3> When the buffer having the agreeing address is the 2nd buffer and the value of the empty bit E of the 3rd buffer is "0", the LRU status controller 103 changes the information of the LRU status so as to interchange the 2nd buffer and the 3rd buffer. For example, when the LRU status before the change is "000" (CBA), it is changed to "010" (CAB), and when the LRU status before the change is "001" (BCA), it is changed to "100" (BAC).

<a4> When the buffer having the agreeing address is the 1st buffer and the values of the empty bits E of the 2nd buffer and the 3rd buffer are both "1", the LRU status controller 103 does not change the information of the LRU status.

<a5> When the buffer having the agreeing address is the 1st buffer, the value of the empty bit E of the 2nd buffer is "0" and the value of the empty bit E of the 3rd buffer is "1", the LRU status controller 103 changes the information of the LRU status so as to interchange the 1st buffer and the 2nd buffer. For example, when the LRU status before the change is "000" (CBA), it is changed to "001" (BCA), and when the LRU status before the change is "010" (CAB), it is changed to "011" (ACB).

<a6> When the buffer having the agreeing address is the 1st buffer and the values of the empty bits E of the 2nd buffer and the 3rd buffer are both "0", the LRU status controller 103 changes the information of the LRU status so as to set the 1st buffer as the 3rd buffer, the 2nd buffer as the 1st buffer, and the 3rd buffer as the 2nd buffer, that is, so as to rotate them. For example, when the LRU status before the change is "000" (CBA), it is changed to "100" (BAC), and when the LRU status before the change is "001" (BCA), it is changed to "010" (CAB).

After the information of the LRU status is updated as described above, the processing goes to Step S107.

In this manner, the LRU status controller 103 logically moves the buffer to which the data from the cache memory 12 is written, to the last stage. Here, an address of data that the CPU accesses when executing the processing often has locality. Therefore, by logically moving the buffer to which the data from the cache memory 12 is written, to the last stage, it is possible to elongate the time before the write is executed to the main memory 30, regarding data at an address highly possible to be accessed again. This makes it possible to reduce the occurrence of a cache miss in the CPU, which makes it possible to reduce the generation frequency of a coherent read request being the snoop request to improve performance.

When the determination at Step S102 results in that there is no buffer having the agreeing address (NO at S102), the LRU status controller 103 determines whether or not there is a buffer whose empty bit E has a value "1" (which is in the empty state) (S105). When the determination results in that there is no buffer whose empty bit E has the value "1", that is, when the values of the empty bits E of all the buffers are "0" (NO at S105), the write to the buffer is kept waited.

On the other hand, when there is a buffer whose empty bit E has the value "1" (YES at S105), the LRU status controller 103 instructs the write controller 104 to write the address and the data to the buffer according to the LRU status. The write controller 104 writes the address Addr and the data Data to the designated buffer, that is, the buffer updated least recently, out of the buffers whose empty bits E have the value "1", and sets values of its empty bit E and snoop bit S to "0" (S106). Then, the processing goes to Step S107.

At Step S107, the buffer control part 101 refers to the status information which is stored in the cache memory 12 together with the data whose write is requested, and determines whether or not this data is shared by another CPU. When the determination results in that the data is shared with another CPU (YES at S107), the buffer control part 101 issues an invalidate request requesting the invalidity of the cache data to the other CPU (S108). In the above-described manner, the write processing to the write buffer 14 is ended.

Next, write processing from the write buffer 14 to the main memory 30 will be described. In the write processing from the write buffer 14 to the main memory 30, after first confirming that the write to the main memory 30 is possible, the buffer control part 101 issues a write request to the memory controller 20 via the bus BUS. Based on an output of the buffer control part 101 and an output of the LRU status controller 103, the address and the data stored in the 1st buffer are read and transferred to the memory controller 20 by the read selection part 105 and the buffer selector 108. Upon receiving the address and the data, the memory controller 20 writes the data to an area at the corresponding address of the main memory 30, and issues a write completion notice when the write is completed.

Then, the write controller 104 sets the value of the empty bit E of the 1st buffer to "1". At this time, when a value of the snoop bit S of the 1st buffer is "1", the write controller 104 outputs, to the cache controller 13, information indicating that the write of the data is completed. The cache controller 13 receiving the information changes the status information of the cache memory 12 so that the status information indicates that the data is shared with another CPU. Thus, in this embodiment, the cache memory 12 is accessed not when a request is received regarding data coherently read in response to a request from another CPU, but the cache memory 12 is accessed when the write to the main memory 30 is completed. This alleviates an obstruction to an access to the cache memory 12 from the CPU core 11, which can improve performance.

Further, the LRU status controller 103 changes the information of the LRU status so as to set the 1st buffer as the 3rd buffer, the 2nd buffer as the 1st buffer, and the 3rd buffer as the 2nd buffer, that is, so as to rotate them. For example, when the LRU status before the change is "000" (CBA), it is changed to "100" (BAC), and when the LRU status before the change is "001" (BCA), it is changed to "010" (CAB). Note that, when the value of the empty bit E of the 1st buffer is "1", the aforesaid write processing to the main memory 30 is not executed.

Figure 5:
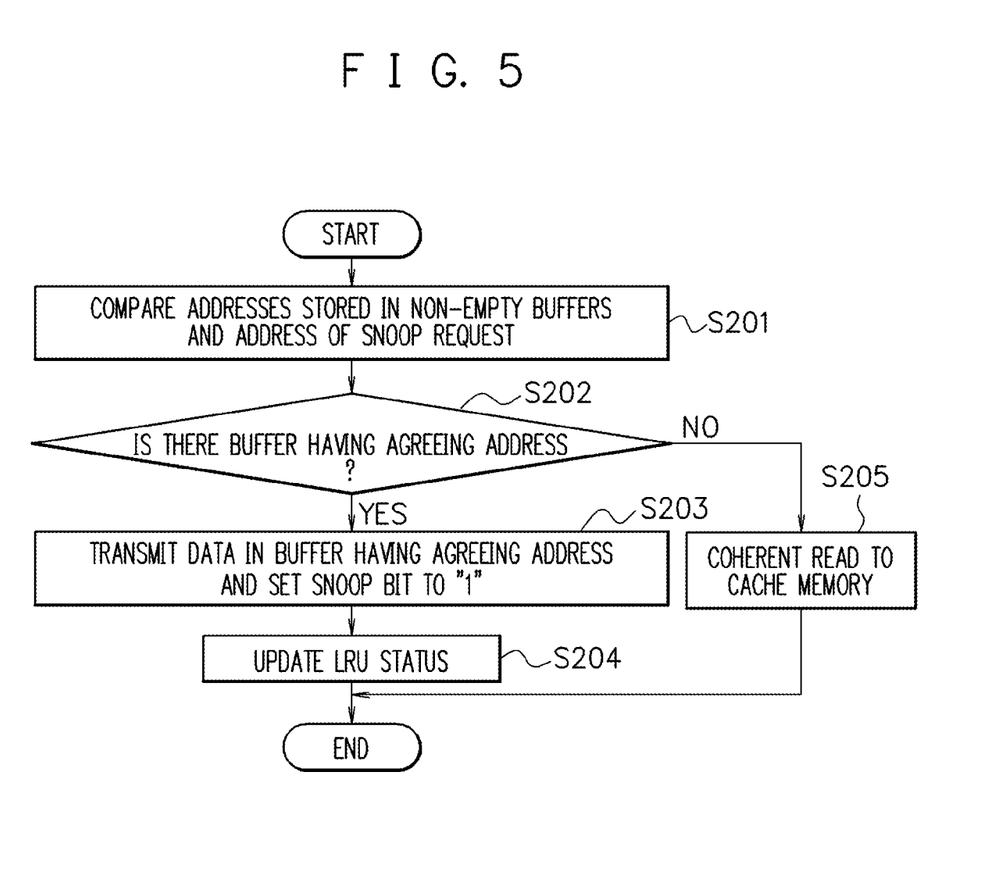
FIG. 5 is a flowchart representing an example of processing relating to a snoop request in this embodiment.

Next, processing when the snoop request is received will be described. FIG. 5 is a flowchart representing an example of the processing relating to the snoop request in this embodiment. The CPU issues a coherent read request as the snoop request to the cache memory of another CPU, when data corresponding to an access request does not exist in the cache memory 12 of the own CPU and a cache miss occurs. In the CPU receiving this snoop request (coherent read request), the comparators 107A, 107B, 107C each compare the address stored in the buffer whose empty bit E does not have the value "1" (which is not in the empty state) and an address of the snoop request, and output the comparison result to the LRU status controller 103 (S201).

Next, based on the outputs of the comparators 107A, 107B, 107C, the LRU status controller 103 determines whether or not there is a buffer having an agreeing address (S202). When the determination results in that there is a buffer having the agreeing address, the processing goes to Step S203, and otherwise, a response to that effect is returned and the processing is ended, and the coherent read is executed to the cache memory 12 (S205). At Step S203, based on an output of the buffer control part 101 and an output of the LRU status controller 103, the CPU transmits data in the buffer having the agreeing address to the CPU being a request origin, by the read selection part 105 and the buffer selector 108. Then, the write controller 104 sets the value of the snoop bit S of the buffer having the agreeing address to "1".

Further, the LRU status controller 103 updates the LRU status so that the buffer having the agreeing address becomes the last stage buffer (newest buffer) (S204). That is, the LRU status controller 103 changes the information of the LRU status in the following ways <b1> to <b6> so as to logically move the buffer having the agreeing address to the last stage.

<b1> When the buffer having the agreeing address is the 3rd buffer, the LRU status controller 103 does not change the information of the LRU status.

<b2> When the buffer having the agreeing address is the 2nd buffer and the value of the empty bit E of the 3rd buffer is "1", the LRU status controller 103 does not change the information of the LRU status.

<b3> When the buffer having the agreeing address is the 2nd buffer and the value of the empty bit E of the 3rd buffer is "0", the LRU status controller 103 changes the information of the LRU status so as to interchange the 2nd buffer and the 3rd buffer. For example, when the LRU status before the change is "000" (CBA), it is changed to "010" (CAB), and when the LRU status before the change is "001" (BCA), it is changed to "100" (BAC).

<b4> When the buffer having the agreeing address is the 1st buffer and the values of the empty bits E of the 2nd buffer and the 3rd buffer are both "1", the LRU status controller 103 does not change the information of the LRU status.

<b5> When the buffer having the agreeing address is the 1st buffer, the value of the empty bit E of the 2nd buffer is "0", and the value of the empty bit E of the 3rd buffer is "1", the LRU status controller 103 changes the information of the LRU status so as to interchange the 1st buffer and the 2nd buffer. For example, when the LRU status before the change is "000" (CBA), it is changed to "001" (BCA), and when the LRU status before the change is "010" (CAB), it is changed to "011" (ACB).

<b6> When the buffer having the agreeing address is the 1st buffer and the values of the empty bits E of the 2nd buffer and the 3rd buffer are both "0", the LRU status controller 103 changes the information of the LRU status so as to set the 1st buffer as the 3rd buffer, the 2nd buffer as the 1st buffer, and the 3rd buffer as the 2nd buffer, that is, so as to rotate them. For example, when the LRU status before the change is "000" (CBA), it is changed to "100" (BAC), and when the LRU status before the change is "001" (BCA), it is changed to "010" (CAB).

After the information of the LRU status is updated in the above-described manner, the processing is ended. Note that, even when the CPU issues the coherent read request as the snoop request to the cache memory of another CPU due to the occurrence of a cache miss, if there is desired data in none of the other CPUs, an access to the main memory 30 is executed and data is read.

According to this embodiment, since coherency of cache data (cache coherency) is kept by the data operation in the write buffer 14, it is possible to reduce snoop operations to the cache memory and also to reduce write operations to the main memory, which contributes to performance improvement of the apparatus. In this embodiment, the update status of the buffers on the respective stages that the write buffer 14 has is managed and controlled by using the LRU algorithm, but this is not restrictive, and the update status of the buffers may be managed and controlled by using another algorithm or the like.

The disclosed arithmetic processing apparatus is capable of reducing the generation of snoops to the cache memory by keeping coherency of cache data by a data operation in the write buffer, enabling an improvement in performance.

All examples and conditional language provided herein are intended for the pedagogical purposes of aiding the reader in understanding the invention and the concepts contributed by the inventor to furthering the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising
a plurality of arithmetic processing parts which access an external memory via a bus, the arithmetic processing parts each comprising:
a cache memory;
a processing part which executes arithmetic processing by using data held in the cache memory;
a write buffer which is provided between an own cache memory and the external memory and has a plurality of stages of buffers each holding a set of data to be written to the external memory and an address of a write destination;
a first control part which controls a write from the own cache memory to own write buffer in write processing from the own cache memory to the external memory via the own write buffer; and
a second control part which controls a write from the own write buffer to the external memory in the write processing from the own cache memory to the external memory via the own write buffer,
wherein the first control part which compares an address of a write destination and the addresses stored in the plurality of stages of buffers, and when any of the plurality of stages of buffers has an address agreeing with the address of the write destination, overwrites data to a buffer having the agreeing address out of the plurality of stages of buffers and logically moves the buffer overwriting data to a last stage out of the plurality of stages of buffers holding the data to be written to the external memory and the address of the write destination, and
wherein; when a certain arithmetic processing part receives a read request of data held in the plurality of stages of buffers included in the own write buffer from another arithmetic processing part, the first control part of the certain arithmetic processing part supplies the data in a buffer holding requested data out of the plurality of stages of buffers and holds, in the buffer, information indicating that a read from another arithmetic processing part is executed, without accessing the own cache memory; and after the certain arithmetic processing part writes the data in the buffer holding the requested data to the external memory, the first control part of the certain arithmetic processing part accesses the own cache memory and updates information stored in the own cache memory indicating that the data is shared with another arithmetic processing part.

2. The arithmetic processing apparatus according to claim 1, wherein, when the certain arithmetic processing part receives the read request of the data held in the plurality of stages of buffers included in the own write buffer from the another arithmetic processing part, the first control part of the certain arithmetic processing part logically moves the buffer to the last stage out of the plurality of stages of buffers holding the data to be written to the external memory and the address of the write destination.

3. A control method of an arithmetic processing apparatus in which a plurality of arithmetic processing parts access an external memory via a bus, the arithmetic processing parts each comprising:
 a cache memory;
 a processing part which executes arithmetic processing by using data held in the cache memory;
 a write buffer which is provided between an own cache memory and the external memory and has a plurality of stages of buffers each holding data to be written to the external memory and an address of a write destination;
 a first control part which controls a write from the own cache memory to own write buffer; and
 a second control part which controls a write from the own write buffer to the external memory, the control method comprising:
 comparing, by the first control part of the arithmetic processing part, an address of a write destination and the addresses stored in the plurality of stages of buffers at the time of a write to the own write buffer from the own cache memory in the write processing from the own cache memory to the external memory via the own write buffer;
 when any of the plurality of stages of buffers has an address agreeing with the address of the write destination, by the first control part of the arithmetic processing part, overwriting data to a buffer having the agreeing address out of the plurality of stages of buffers and logically moving the buffer overwriting data to a last stage out of the plurality of stages of buffers holding the data to be written to the external memory and the address of the write destination,
 when a certain arithmetic processing part receives a read request of data held in the plurality of stages of buffers included in the own write buffer from another arithmetic processing part, by the first control part of the certain arithmetic processing part, supplying the data in a buffer holding requested data out of the plurality of stages of buffers and holding, in the buffer, information indicating that a read from another arithmetic processing part is executed, without accessing the own cache memory; and
 after the certain arithmetic processing part writes the data in the buffer holding the requested data to the external memory, by the first control part of the certain arithmetic processing part, accessing the own cache memory and updating information stored in the own cache memory indicating that the data is shared with another arithmetic processing part.

* * * * *